United States Patent

Reaves

[15] 3,670,913
[45] June 20, 1972

[54] BIN UNLOADER BREAK BACK SYSTEM
[72] Inventor: Robert S. Reaves, Blue Springs, Mo.
[73] Assignee: Allis-Chalmers Manufacturing Company, Milwaukee, Wis.
[22] Filed: April 19, 1971
[21] Appl. No.: 135,304

[52] U.S. Cl..........................214/522, 214/83.36, 214/83.32, 56/10.4
[51] Int. Cl............................................................B60p 1/42
[58] Field of Search ....................214/83.26, 83.32, 521, 522; 198/64, 113; 56/10.4

[56] References Cited

UNITED STATES PATENTS

| | | | |
|---|---|---|---|
| 2,981,400 | 4/1961 | Rohweder | 198/113 X |
| 3,390,515 | 7/1968 | Schaible et al | 56/10.4 |

Primary Examiner—Albert J. Makay
Attorney—Kenneth C. McKivett, Charles L. Schwab and Robert B. Benson

[57] ABSTRACT

This disclosure is concerned with providing an improved swingable unloading auger conveyer for a combine harvester in that it provides assistance in swinging the auger conveyer from a transport to the unloading position; it provides an automatic means of aligning the driving elements of the auger so that they become properly indexed during the previously mentioned positioning operation; and it provides a safety release in case the unloading conveyer when in unloading position hits some obstruction this safety release being in the nature of a break back brace member having a frictional engagement and with the aforementioned swinging assist functioning as an energy absorbing element during the break back.

10 Claims, 14 Drawing Figures

PATENTED JUN 20 1972 3,670,913

Inventor
Robert E. Reaves
By Kenneth TucKwee
Attorneys

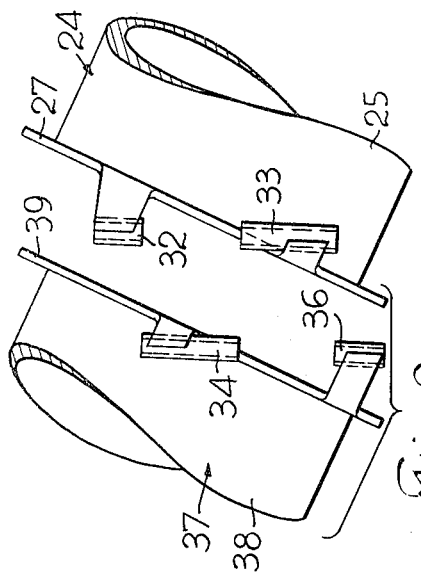
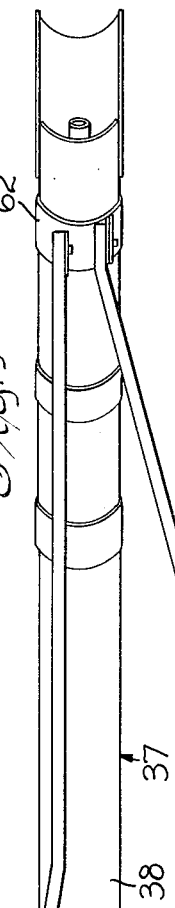
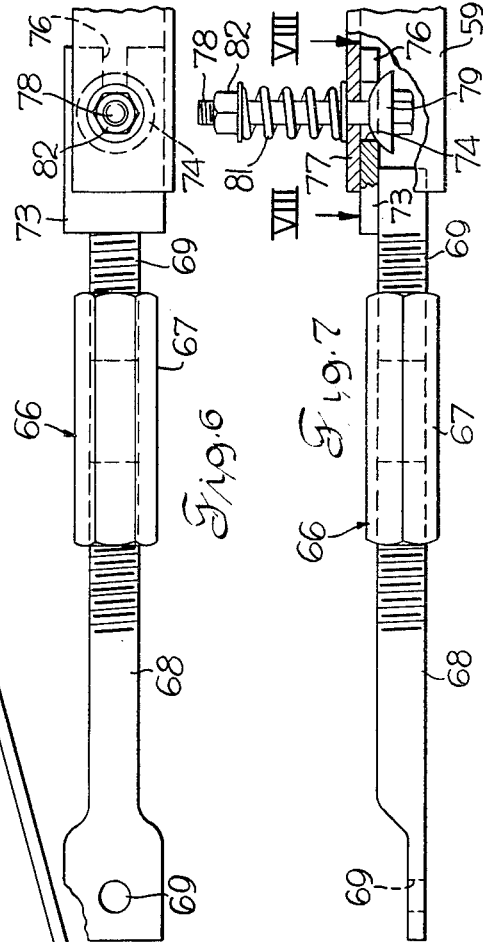

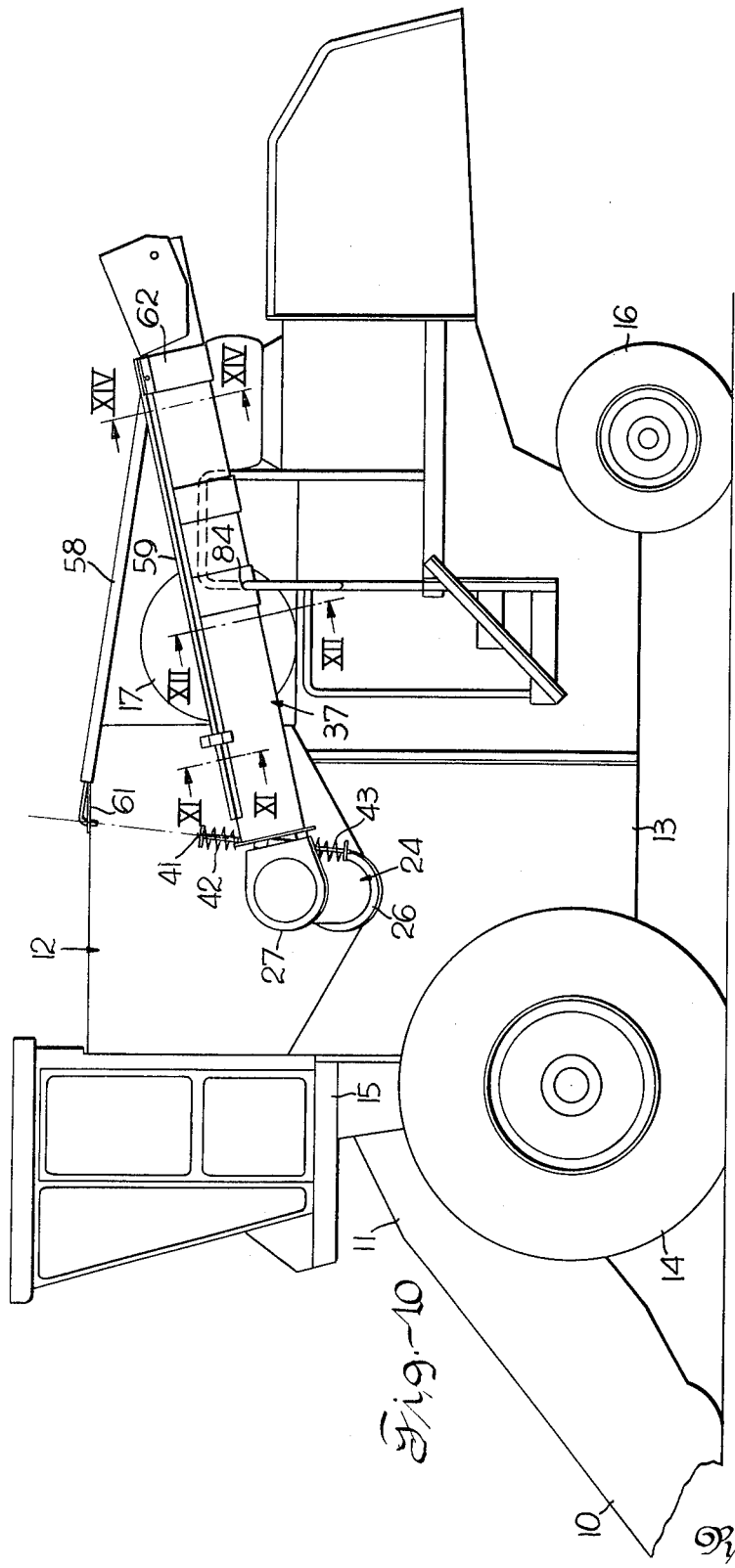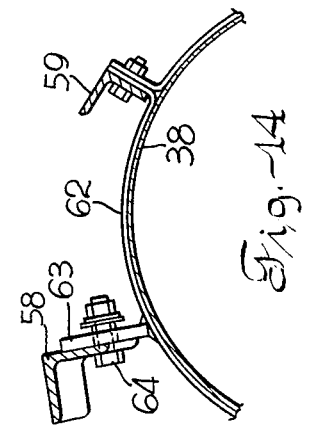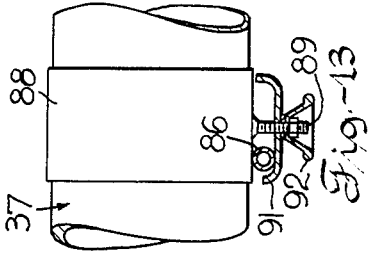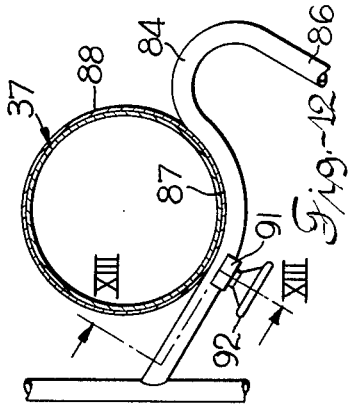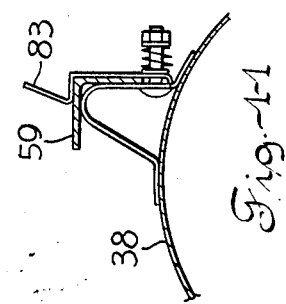

BIN UNLOADER BREAK BACK SYSTEM

This invention relates to combined harvester-threshers, and it is concerned more particularly with the provision of an improved auger type conveying system for unloading threshed material from a storage bin which is mounted on and forms part of the harvester-thresher.

Combines, particularly those of the self-propelled type, are large machines both as to width and height, and these machines are ordinarily provided with a large bin into which threshed grain is delivered. When the bin is filled, a wagon or truck is drawn alongside the combine and the threshed grain is discharged from the bin via a conveyor, normally of the enclosed auger type. Many times this unloading process is carried out while the combine continues to move down a field harvesting grain. In the case of the typical combine, the auger conveyer extends laterally upwardly at one side of the combine to an extent sufficient to provide for adequate side clearance between the combine and the truck and for adequate top clearance between the truck and the discharge end of the auger conveyor. This lateral overhang of the unloading conveyor materially increases the overall width of the machine. In many combines heretofore known, transport of the combine along narrow rows and through narrow gates or through areas of low clearance could only be affected by completely removing the unloading conveyor. In other combines, provision was made for folding of the conveyor to a position in which it would lie alongside of the combine. In many constructions of the latter type, the provision for folding of the unloading conveyor was of such complicated nature that it was not a one man job.

Generally, it is an object of this invention to provide an improved harvester-thresher wherein an auger type unloading conveyor system is so constructed as to avoid the hereinbefore outlined difficulties in a practical and entirely satisfactory manner.

More specifically, it is an object of the invention to provide an improved mounting for an auger type conveyer on a combine which mounting permits easy (one man) adjustment of the conveyer to an unloading position or a transport position wherein the conveyer lies within the profile of the combine.

It is a further object of this invention to provide an improved conveyer mounting of the hereinabove outlined character which is so constructed that an operator may readily adjust the conveyer to an unloading position or a transport position without having to manually lift the full weight of the conveyor.

A further object of this invention is to provide an improved harvester-thresher of the hereinabove outlined character incorporating an adjustably mounted auger and tube assembly which can be positioned in unloading position all during actual harvest operation and which is releasable when accidentally striking an object for swinging toward transport position with energy absorbing means for dampening such swinging action.

A further object of this invention is to provide easily manufactured and relatively inexpensive parts adapted for use in moving an auger type conveyer from transport position to discharge position or vice versa.

A further object of this invention is to provide a combine harvester with a discharge auger conveyer which is capable of being struck when in its discharge position without being damaged.

It is a further object of this invention to provide a discharge auger type conveyer for a combine harvester which can be rapidly and easily shifted from transport position to discharge position or vice versa by one man.

Other objects and features of the invention will become apparent from the following specification and the drawings.

In the drawings:

FIG. 2 is an enlarged plan view of part of the grain bin and unloading auger conveyer shown in unloading position;

FIG. 6 is an enlarged plan view of a part of a brace rod shown in FIG. 2;

FIG. 7 is a side elevation of the brace rod shown in FIG. 6;

FIG. 8 is a section view taken on line VIII—VIII of FIG. 7;

FIG. 9 is an exploded side elevation view similar to FIG. 5 with some parts removed for clarity of illustration;

FIG. 10 is a side elevation of the combine with the discharge conveyer in transport position;

FIG. 11 is a section view taken on line XI—XI of FIG. 10;

FIG. 12 is a section view taken on line XII—XII of FIG. 10;

FIG. 13 is a section view taken on line XIII—XIII of FIG. 12; and

FIG. 14 is a section view taken on line XIV—XIV of FIG. 10;

Figure 1:
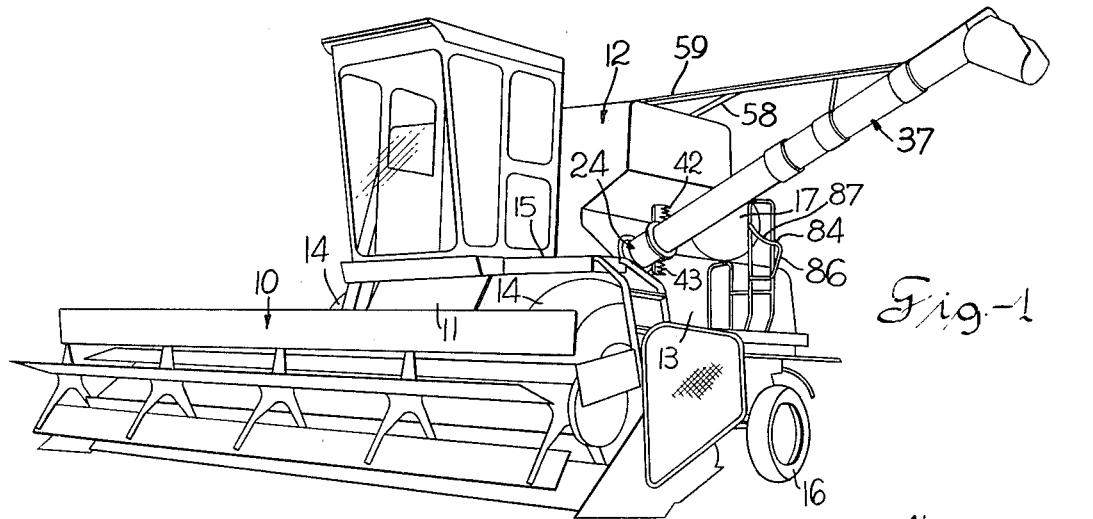
FIG. 1 is a front perspective view of a combine-harvester embodying the invention with the auger conveyer thereof in discharge position.

Referring to FIGS. 1 and 10 it is seen that a self-propelled harvester is provided including a cutting and conveying mechanism 10, a threshing and separating mechanism 11, and a grain or storage bin 12; all of these mechanisms being positioned on a frame structure chassis 13 including front traction wheels 14, an operator's platform 15, and dirigible rear wheels 16. Also mounted on chassis 13 is an engine 17 operatively connected to the mentioned mechanisms by means (not shown). A grain elevator (not shown) is mounted adjacent the discharging portion of separating mechanism 11 in grain receiving relation thereto and moves grain into grain bin 12. A transversely horizontally extending unloading auger type conveyer 18 (FIG. 2) is journaled at one end in bearing 19 (FIG. 3) carried by sidewall 21. Conveyor 18 (FIG. 2) extends horizontally just above the floor of bin 12 and the other end of conveyor 18 (not shown) is journaled in the sidewall of bin 12 opposite to sidewall 21. This other end of conveyor 18 is operatively connected to engine 17 for being driven by same (by means not shown). Conveyor 18 includes a central shaft 22 upon which auger flighting 23 is mounted. An extension 24 (FIG. 3) of conveyor 18 extends outwardly and upwardly from grain bin wall 21 and includes a surrounding tube 25 provided with flanges 26 and 27 on the ends thereof. Flange 26 is attached to sidewall 21. Extension conveyer 24 angles upwardly at approximately 25° to the horizontal and includes a central shaft 28 connected to shaft 22 by means of universal joint 29. The other or free end of shaft 28 has a socket member 30 attached thereto. Also attached to shaft 28 is flighting 31.

Referring to FIG. 9 it is seen that flange 27 of tube 25 has a pair of hinge elements 32 and 33 attached thereto and these hinge elements 32 and 33 can be mated with hinge elements 34 and 36 of discharge conveyor 37. Discharge conveyor 37 includes an outer tube 38 having a flange 39 to which is attached the hinge elements 34 and 36. A hinge rod 41 (FIG. 5) is received within these hinge elements to provide pivotal movement of conveyor 37 about the longitudinal axis of rod 41. The longitudinal axis of rod 41 is not quite vertical as is shown in FIG. 10. The upper end of rod 41 is closer to the rear end of the combine than the lower end of rod 41. This difference permits conveyor 37 to be pivoted about rod 41 to the transport position shown in FIG. 10 wherein the outer end of conveyor 37 is at a height less than grain bin 12 and is within the outer limits of the side to side profile defined by the traction wheels of the combine (not shown). It is to be noted (see FIG. 5) that rod 41 extends beyond hinge elements 33 and 34 and on these extensions of rod 41 a pair of spaced apart pair of torsion springs 42 and 43 are mounted for movement about the longitudinal axis of rod 41. Springs 42 and 43 are retained on rod 41 by means of pins 44 and washers 46. The outer ends of springs 42 and 43 are received in member 47 and the inner ends are received in member 48. Members 47 and 48 are in contact with conveyor 24 and 37 respectively, but in the position shown in FIG. 5 these springs are not exerting any torsional force on conveyer 24 or 37 as this shown position is the neutral position of these springs. It is to be noted that torsion springs 42 and 43 are die springs with square or rectangular cross-sections so as to provide a wide range of torsional energy.

Figures 3, 5:
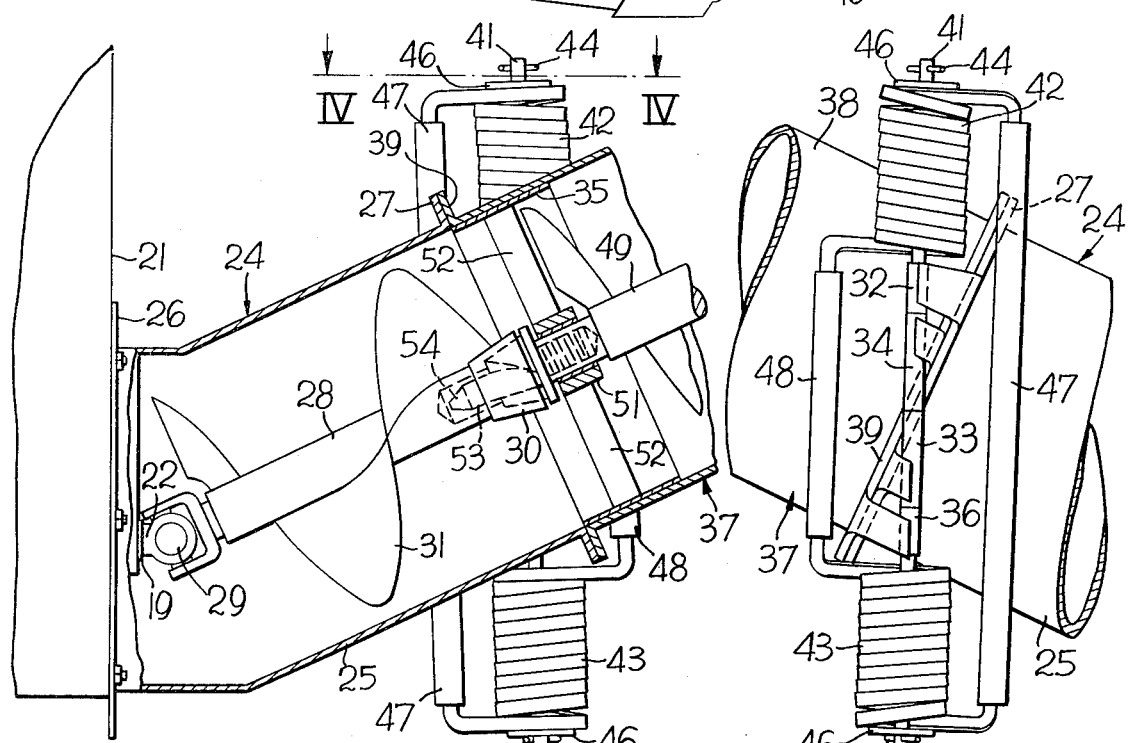
FIG. 3 is an enlarged section view taken on line III—III of FIG. 2.
FIG. 5 is a view looking at the back side of FIG. 3.
Figure 4:
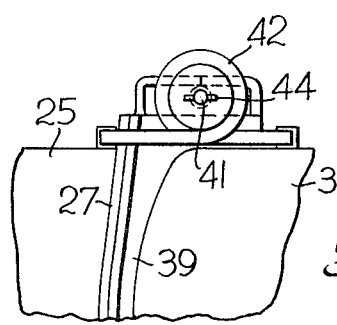
FIG. 4 is a view taken on line IV—IV of FIG. 3.
Figure 15:
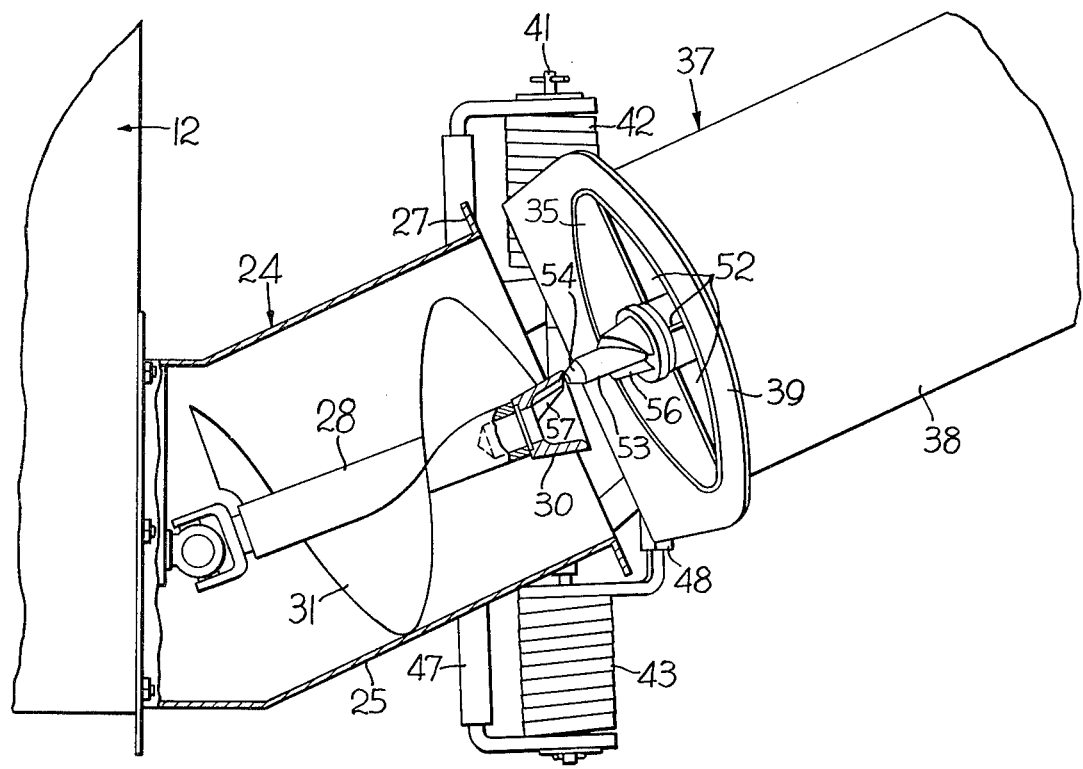
FIG. 15 is a section view similar to FIG. 3 demonstrating the connection of the conveyors.

Discharge conveyer 37 (FIG. 3) includes a central shaft 49 which is journaled at its lower end in a centrally positioned bearing 51 carried by straps 52 which are attached to sleeve 35 carried by tube 38. The upper end of shaft 49 is journaled in a similar manner (not shown). A pilot assembly 53 is attached to the lower end of shaft 49. Pilot assembly 53 is provided with a tapered end portion 54 (FIG. 15) and a driven portion 56 which mates with a drive portion 57 in socket member 30 for driving conveyer 37 when conveyer 37 has been aligned with conveyer extension 24. It is to be noted as shown in FIGS. 3 and 15 that tapered end portion 54 is centrally located in tube 38 but as is shown in FIG. 15 socket member 30 is not supported in a central position relative to tube 25 in that the position of the outer end of shaft 28 depends on which portion of flighting 31 is functioning to support socket member 30 on tube 25, socket member 30 is so proportioned that in its extreme position of being off of the longitudinal axis of tube 25 (as shown in FIG. 15) pilot assembly 53 will always enter member 30 to provide a driving connection between shafts 28 and 49 when conveyer 37 has been pivoted to a position wherein flanges 27 and 39 meet. It is to be noted that a seal (not shown) may be used between flanges 27 and 39 to prevent any possible loss of grain.

A pair of braces 58 and 59 (FIG. 2) held support conveyer 37 particularly when in the discharge position therein shown. The inner end of brace 58 is pivotally connected to a bracket 61 on bin 12 for pivotal movement about a substantially vertical axis which is coincident with the longitudinal axis of hinge rod 41 as is indicated in FIG. 10. The outer end of brace 59 is attached to upstanding portions of a collar 62 encircling tube 38 of conveyer 37.

Brace 58 is pivotally connected at its outer end to a bracket 63 on collar 62 by means of a bolt and nut 64. The inner end of brace 59 is connected to bin 12 by means of a breakaway mechanism 66. Breakaway mechanism 66 includes a twin buckle 67 (FIGS. 6 and 7) having two elements 68 and 69 each threadably engaged at one end therewith. The unthreaded end of element 68 is provided with an opening 69 for receiving a stud 71 (FIG. 2) carried by an upper portion of bin 12. A handwheel 72 threadably engaged with stud 71 retains element 68 positioned relative to bin 12. The unthreaded end of element 69 (FIGS. 6 and 7) is provided with a PLATE MEMBER 73 having a hole 74 therein connected to a slot 76 which terminates at the outer end of element 69. Brace 59 is provided with a hole 77 which receives a bolt 78 having a spherically headed washer 79 thereon which is biased partly into hole 74 by means of spring 81 which is positioned about bolt 78 between brace 59 and nut and washer 82. The bias of spring 81 keeps washer 79 positioned in hole 74 and thereby keeping break away mechanism 66 frictionally engaged with brace 59. When an abnormal pull is applied by brace 59 i.e., when conveyer 37 hits an obstruction while moving forward, washer 79 would be cammed out of hole 74 and the shank of bolt 78 would be free to pass through slot 76 disconnecting brace 59 from break away mechanism 66 thus permitting conveyer 37 to pivot rearwardly about pin 41 towards transport position (FIG. 10). As conveyer 37 pivots rearwardly springs 42 and 43 are torqued up and thereby absorb much of the energy imparted to conveyer 37 by the unfortunate striking of such obstruction and thereby slow down the swing of conveyer 37 thus preventing destructive contact between conveyer 37 and the combine.

After the break away mechanism 66 has released the discharge conveyer 37 so that it can swing rearwardly, the operator can then return conveyer to operative position by removing handwheel 72 (FIG. 2) from stud 71 and then lifting the breakaway mechanism from stud 71. The operator would then insert plate 73 (FIGS. 6 and 7) of the breakaway mechanism 66 between washer 79 and brace 59 by guiding the shank of bolt 78 through slot 76 into hole 74. To accomplish this readily it might be necessary to relax spring 81 somewhat by loosening nut 82. After the parts are repositioned as shown in FIGS. 6 and 7 nut 82 should be retightened to provide the proper amount of frictional engagement between brace 59 and breakaway mechanism 66. The free end of mechanism 66 would then be reconnected to stud 71 and secured by hand wheel 72 after conveyer 37 was pivoted to discharge position as assisted by the action of springs 42 and 43.

Assuming that the discharge conveyer 37 is positioned in discharging position as shown in FIG. 1 and the operator wishes to swing conveyer 37 to the transport position the operator would remove hand wheel 72 (FIG. 2) from stud 71 and remove breakaway mechanism 66 from stud 71. Brace 59 which has an angle cross-section would then be inserted under spring latch 83 carried by tube 38 as shown in FIG. 11. Then against the bias of springs 42 and 43 (FIG. 15) conveyer 37 will be swung rearwardly until it can be pushed over hump 84 in ladder hand rail 86 carried by chassis 13 and cradled in a depression 87 in ladder hand rail 86. A band 88 on conveyer 37 is provided with a radially extending stud 89 (FIGS. 12 and 13) to which a clamp member 91 can be attached by handwheel 92 for clamping conveyer 37 to handrail 86.

One man can readily move the discharge conveyer 37 to operative position from the transport position shown in FIG. 10. The operator would loosen handwheel 92 (FIGS. 12 and 13) until latch member 91 is free of ladder rail 86. Latch member 91 can then be tightened down against band 88 by tightening handwheel 92. Conveyor 37 is then raised up over hump 84 and spring 42 and 43 will move the conveyer to a position approximately midway between transport position and operative position. The operator then climbs onto platform 15 (FIG. 10) reaches back and releases brace 59 from clamp 83. Then with a small amount of pushing and pulling on brace 59 in order to get some additional help from springs 42 and 43 the operator can place the end of breakaway mechanism 66 over stud 71 and fasten the mechanism down with handwheel 72. Pilot member 53 (FIG. 15) enters socket member 30 no matter what off center position socket member 30 is in. As shown in FIG. 15 socket member 30 is shown at maximum extreme off center position but it is obvious that pilot member 53 will enter socket 30 and provide a driving connection therebetween. The conveyer is now ready to be powered for unloading bin 12. As soon as conveyer extension 24 is powered a driving connection is established between driving portion 57 of socket 30 and driven portion 56 of pilot 63 thus driving conveyer 37.

The embodiments of the invention in which an exclusive property or privilege is claimed are defined as follows:

1. In a combine harvester having an operator's platform, a grain bin and a horizontally extending unloading conveyer positioned within the bottom portion of said bin between the sidewalls thereof, a conveyer extension attached to said unloading conveyer and extending upwardly from one of said sidewalls, a discharge conveyer pivotally mounted on the discharge end of said conveyer extension, said discharge conveyer being pivotable to a transport position alongside said harvester or pivotable to an operative position forming a continuation of said conveyer extension, biasing means for returning said discharge conveyer to operative position, a brace member carried by said harvester for supporting said discharge conveyor, said brace member being pivotally connected at one end to said harvester for movement about the same axis as said discharge conveyer pivots, a second brace member carried by said harvester for supporting said discharge conveyor, breakaway latch means interposed between said second brace member and said harvester and adapted to break when a rearwardly directed force is applied to said discharge conveyer of a sufficient magnitude, said biasing means being adapted to absorb the energy of said rearwardly directed force to eliminate destructive contact between said discharge conveyor and said harvester.

2. In a combine harvester as recited in claim 1 and wherein said biasing means comprises a pair of torsional springs mounted about the pivot axis of said discharge conveyer for resisting pivotal movement of said discharge conveyer in a rearward direction.

3. In a combine harvester as recited in claim 2 and wherein said torsional springs are constructed having a square cross-section.

4. In a combine harvester as recited in claim 2 and wherein said torsional springs are constructed having a rectangular cross-section.

5. In a combine harvester as recited in claim 1 and wherein means are provided for one man to move said discharge conveyer from said transport position to said operative position.

6. In a combine harvester as recited in claim 5 and wherein said means comprises said torsion springs for moving said discharge conveyer halfway to said operative position and the use of said second brace for moving said discharge conveyer to said operative position.

7. In a combine harvester as recited in claim 1 and wherein said breakaway latch means is adjustable to break under any preselected force.

8. In a combine harvester as recited in claim 1 and wherein said breakaway latch means is readily adjustable as to length to provide ease of attachment of said latch means to said combine.

9. In a combine harvester as recited in claim 1 and wherein said extension conveyor is provided with a central shaft having a socket member attached to the discharge end thereof and said discharge conveyer is provided with a shaft having a centered shaft including a pilot assembly receivable in said socket for providing a driving connection therebetween whenever said discharge conveyer is pivoted to operative position.

10. In a combine harvester as recited in claim 9 and wherein said socket is so configured as to receive said pilot assembly regardless of the out of center position of said socket.

* * * * *